UNITED STATES PATENT OFFICE.

WILHELM BUDDEUS, OF CHARLOTTENBURG, GERMANY.

DRY TREATMENT OF ORES.

1,121,226.      Specification of Letters Patent.      Patented Dec. 15, 1914.

No Drawing.      Application filed February 5, 1914. Serial No. 816,825.

*To all whom it may concern:*

Be it known that I, Dr. WILHELM BUDDEUS, a subject of the Duke of Saxe-Coburg-Gotha, and resident of Charlottenburg, German Empire, have invented certain new and useful Improvements Relating to the Dry Treatment of Ores, of which the following is a specification.

This invention relates to the dry treatment of zinc blende, ores containing blende, and similar metallurgical products. The roasting of zinc blende and ore containing blende has hitherto been effected almost exclusively by disintegrating the same, in cases where it is not already in a finely divided condition, and then roasting it to deadness in externally heated furnaces. In some cases the ore in lump form has been given a preliminary roasting in kilns or shaft furnaces, but has nevertheless required to be roasted in the same furnace as is used for finely divided ore, in order to bring it to the dead-roasted condition. Latterly, finely divided blende has been roasted in mechanical furnaces until the sulfur content is reduced to about 8 or 10 per cent., and has then been roasted to deadness in externally heated furnaces. It has also been proposed to roast blende to deadness by blowing it with air into a highly heated chamber or by supplying highly heated air to it. In all such proposals, however, it is necessary that the blende to be roasted to deadness, should be in a disintegrated condition.

According to the present invention the disintegrated or finely divided ore or similar material is formed into briquets, and these briquets are then roasted to deadness. The briqueting of the ore renders it possible to roast it in briquet form in shaft furnaces or kilns after the manner sometimes adopted with ore in coarse or lump form, with the difference, however, that the porous briquets obtained by the briqueting of finely divided ore afford a quicker and more thorough access for air than is the case with the compact ore in lump form, the result being that, owing to the higher combustion temperature attained, a more thorough roasting is obtained, the sulfur content being reduced to 1 to 2 per cent. Other fuel may be mixed with the briquets either prior to briqueting or during the roasting, or the briquets may be roasted to deadness by a burning gas current or by a compressed air blast.

One method of carrying the invention into effect consists in mixing disintegrated or finely divided blende with a binding agent, such for example as calcium silicate or various other salts, and in forming the mixture into briquets. The binding medium prevents the blende particles from falling apart during the subsequent heating. These briquets may be dried, if necessary, and are then kindled in a suitable furnace, such as a shaft furnace, and are roasted off by the aid of a natural air draft or compressed air. The briquets can be given any desired form, being preferably spherical, egg-shape, or cylindrical, and equal in size. The briquets together with the fuel can be blown continuously into the furnace, or can be introduced in charges. The furnace may be provided with a device for directing a burning gas current onto the briquets after they have been preliminarily roasted.

Having now particularly described and ascertained the nature of my said invention and in what manner the same is to be performed, I declare that what I claim is:—

The treatment of zinc blende, ore containing blende, and similar metallurgical products, consisting in mixing the finely divided or disintegrated material with a binding agent such as calcium silicate, forming it into briquets, and roasting the briquets with fuel in the presence of an air current, and finally directing a burning gas current against the briquets.

The foregoing specification signed at Berlin, this 29th day of December, 1913.

DR. WILHELM BUDDEUS.

In presence of two witnesses:
HENRY HASPER,
WOLDEMAR HAUPT.